March 28, 1967 T. E. KIMBLE 3,311,029
DIFFERENTIAL FLUID PRESSURE OPERATED MECHANISM
Filed June 18, 1965
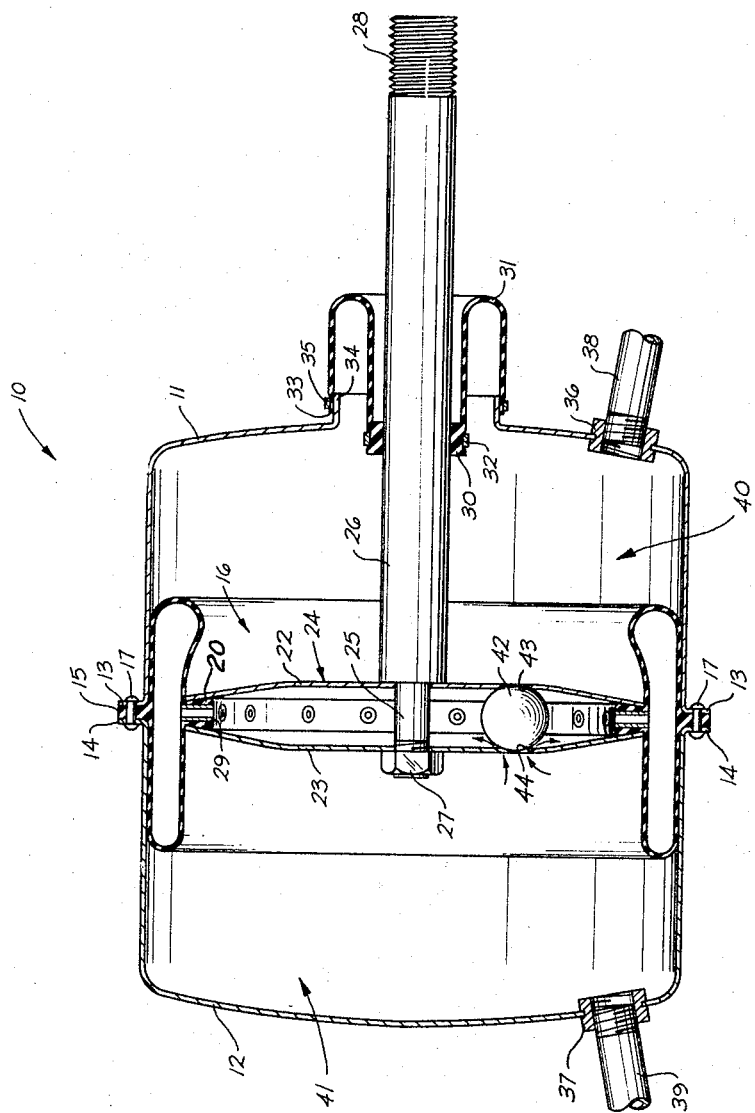
INVENTOR
T.E. KIMBLE
BY JM Presson
ATTORNEY

3,311,029
DIFFERENTIAL FLUID PRESSURE OPERATED MECHANISM
Thomas E. Kimble, Pataskala, Ohio, assignor to Western Electric Company, Incorporated, New York, N.Y., a corporation of New York
Filed June 18, 1965, Ser. No. 465,029
1 Claim. (Cl. 92—100)

This invention relates generally to a differential fluid pressure operated mechanism of the rolling seal type and, more specifically, to a differential fluid pressure operated mechanism embodying an internal rolling tubular seal.

Differential fluid pressure operated mechanisms of the rolling seal type are utilized to convert differential fluid pressures to linear mechanical displacements. Such mechanisms typically comprise a casing formed with a hollow cylindrical interior for receiving two fluids at unequal pressures, a fluid pressure responsive piston mounted for reciprocative movement in the cylindrical interior, and an annular flexible tube or diaphragm which is sealed to the periphery of the piston and to the interior of the casing to form a rolling tubular seal between the piston and the casing interior. The piston and the rolling tubular seal form two pressure-tight, fluid-receiving chambers in the casing so that pressure differentials between the chambers act against and cause displacement of the piston and rolling seal.

With the interior of the rolling tubular seal at ambient pressure, the generation of a relatively large pressure differential between the two chambers may cause the tubular section that provides a pressure-tight seal for the chamber under the greater pressure to fold into the chamber which is under a lesser pressure. This folding of the tubular section that is in contact with the fluid in the greater pressurized chamber causes collapse of the rolling seal and thereby adversely effects the operation of the mechanism.

It may appear that one possible expedient for overcoming the problem of the rolling seal collapsing under relatively large pressure differentials would be to fill the seal initially with a fluid at a pressure greater than the pressure anticipated in either chamber. Another possible expedient might appear to be to provide an external source for supplying a regulated fluid pressure to the seal during the operation of the mechanism. However, and as will be evident to those working in the art, neither of these expedients are feasible from a practical standpoint. The possibility of a pressure leak developing in the tubular seal over a prolonged period of time and the difficulty in predicting the maximum pressure differential that the mechanism will receive during the operation thereof ordinarily renders the expedient of providing a high initial internal pressure in the tubular seal unfeasible. The required use of an external regulated fluid pressure source for maintaining a predetermined pressure in the tubular seal would increase considerably the complexity and cost of the fluid operated or controlled system utilizing the mechanism as a component thereof.

It is broadly an object of this invention to insure proper inflation of the rolling seal of such devices during the operation thereof.

Another object is to provide a differential fluid pressure operated mechanism of the rolling seal type, wherein adequate pressure within the rolling seal is automatically provided during the operation of the mechanism.

In accordance with the general principles of the invention, these objects are attained in a differential fluid pressure operated mechanism having two fluid-pressure receiving chambers formed in part by a piston having a rolling annular seal affixed to the periphery thereof. A pressure-responsive valve is embodied in the piston for directing a quantity of the fluid in the greater pressurized chamber to the rolling seal while substantially blocking fluid flow between the two chambers.

Other objects and features of the invention will be apparent from the following detailed description when considered in conjunction with the accompanying drawing which illustrates a sectional side view of the differential fluid pressure operated mechanism of this invention.

Referring now to the drawing for a more complete understanding of the invention, a differential fluid pressure operated mechanism constructed in accordance with the principles of this invention is designated generally by the numeral 10. Two concentric casing sections 11 and 12 form an outer casing for the mechanism 10. Casing sections 11 and 12 are of substantially cylindrical shape and are provided with circular peripheral flanges 13 and 14, respectively. The opposed faces of the two flanges 13 and 14 receive an outer annular lip 15 formed on a flexible tubular annulus 16. The lip 15 may be clamped pressure-tight between the opposing faces of the flanges 13 and 14 by a plurality of rivets 17, or by any other suitable means.

The annulus 16 is preferably composed of a flexible and nonporous material, such as rubber or a rubber-like composition. An inner annular lip 20 of the annulus 16 is clamped between a pair of concentric, arcuate metallic discs 22 and 23, the discs 22 and 23 and the lip 20 forming therebetween a hollow piston designated generally by the numeral 24. The flexible tubular annulus 16 provides a rolling seal between the piston 24 and the interior walls of the casing sections 11 and 12.

The discs 22 and 23 are provided with axial, concentric bores that receive a reduced diametered shaft 25 formed on the innermost end of a piston rod 26. The innermost end of the shaft 25 is externally threaded to receive a nut 27 which may be turned to press the discs 22 and 23 together so that the inwardly extending peripheral edges of the discs clamp against the lip 20 to effect pressure-tight seals between the lip 20 and the discs 22 and 23. The threaded end 28 of the piston rod 26 may be connected to a device (not shown) that utilizes the fluid pressure controlled displacement of the rod 26 for the operation or control thereof.

The lip 20 is formed with plural radial orifices which individually receive hollow, cylindrical metal sleeves 29. The sleeves 29 insure that plural paths are available for the transmission of fluid pressures between the interior of the piston 24 and interior of the annulus 16 after the discs 22 and 23 are clamped pressure-tight against the lip 20.

One end 30 of a flexible, nonporous diaphragm 31, which may be composed of rubber or a rubber-like composition, is compressed against the surface of the rod 26 by a retractable metal ring or band 32 so as to form a pressure-tight seal between the diaphragm end 30 and the rod 26. The opposite end 33 of the diaphragm 31 is sealed pressure-tight to an outer surface of a circular flange 34 formed on the casing 11 by another retractable metal ring or band 35.

A pair of internally threaded nuts 36 ad 37 may be formed integral with the casing sections 11 and 12, respectively, or may be suitably affixed and sealed to the casing sections 11 and 12 to insure a pressure-tight seal therebetween. The nuts 36 and 37 receive externally threaded fluid conveying tubes 38 and 39, respectively. The tube 38 typically serves to supply and exhaust fluid to a pressure-tight chamber 40 formed by the casing section 11, the disc 22 and the flexible tubular section of the annulus 16 that extends from the disc 22 to the flange 13. The tube 38 also typically serves to supply and exhaust fluid to a pressure-tight chamber 41 formed by the casing section 12, the disc 23 and the flexible tubular section of the annulus 16 that extends from the disc 23 to the flange 14.

A ball 42 is seated between a pair of concentric, circular piston ports 43 and 44 that are formed in the discs 22 and 23, respectively. The ball 42 and the piston edges defining the piston ports 43 and 44 form a ball check valve between the interior of the piston 24 and both pressure-tight chambers 40 and 41.

If the fluid received by the chamber 40 from the tube 38 is at a greater pressure than the fluid received by the chamber 41 from the tube 39, the ball 42 will be driven toward the left, as viewed in the drawing, to substantially uncover the port 43 and to block the port 44. A quantity of the fluid from the chamber 40 which is at the greater pressure will then flow through the port 43 and be received by the interior of the piston 24, thereby increasing the pressure level in the piston 24 to substantially that of the pressure level in the chamber 40. This increase in pressure in the piston 24 will be transmitted through the sleeves 29 to the interior of the annulus 16 and will raise the pressure in the annulus 16 to a level substantially equal to that of the fluid in the chamber 40. Since the port 44 will now be substantially blocked by the pressure against the ball 42, there will be no significant fluid flow from the chamber 40 to the chamber 41 through the piston 24. The piston 24 therefore will be driven to the left, as viewed in the drawing, to effect a corresponding lineal displacement of the piston rod 26.

Conversely, if the fluid received by the chamber 41 from the tube 39 is under the greater pressure than the pressure of the fluid in the chamber 40, the ball 42 will be driven to the position as illustrated by the drawing where the port 43 is blocked and the port 44 is substantially open. Under these conditions, the internal pressure of the annulus 16 will now rise to a level which is substantially equal to that of the level of the fluid pressure in the chamber 41 while the piston 24 is driven to initiate a movement to the right, as viewed in the drawing.

Thus, in accordance with the principles of the instant invention, the internal pressure of the rolling seal annulus 16 will always be substantially equal to that of the greatest pressure in either the chamber 40 or the chamber 41 and the possibility of the tubular seal collapsing under relatively large differentials in pressure between the chambers 40 and 41 is accordingly obviated.

What is claimed is:

A differential fluid pressure operated mechanism, comprising:
- a casing having a hollow interior of substantially cylindrical configuration for receiving and containing fluid therein,
- a piston formed of a pair of concentric, annular, metal discs having concentrically aligned, circular valve seats formed therein, said piston being mounted for lineal displacement in the casing interior, the internal diameter of the casing interior being greater than the outer diameter of said piston,
- a flexible tubular annulus interposed between said piston and the casing interior, said annulus having an inner radially apertured, annular lip sealed to and clamped, along an inner peripheral surface between adjacent peripheral surfaces of said concentric, annular, metal discs of said piston and being sealed along an outer peripheral surface to the casing interior, said piston and annulus thereby separating said casing into first and second pressure-tight chambers,
- a fluid conveying passage formed in said piston and communicating with the interior of said annulus through the radial apertures in the annular lip of said annulus and communicating with both of said chambers, and
- a pressure-responsive valve having a ball, mounted for minute movement, solely between the concentrically aligned, circular valve seats in the annular metal discs of said piston and being positioned in said passage, said valve being actuated by a pressure differential between said first and second chambers for blocking the flow of fluid through said piston and for opening said passage to fluid flow from the chamber at the greater pressure.

References Cited by the Examiner
UNITED STATES PATENTS

| | | | |
|---|---|---|---|
| 254,960 | 3/1882 | Hale | 92—183 |
| 2,341,502 | 2/1944 | Ingres | 92—97 |
| 2,864,258 | 12/1958 | Klingler | 277—34 |

MARTIN P. SCHWADRON, *Primary Examiner.*